US006661201B2

(12) United States Patent
Ueda et al.

(10) Patent No.: US 6,661,201 B2
(45) Date of Patent: Dec. 9, 2003

(54) METHOD FOR CONTROLLING BATTERY CHARGE AND DISCHARGE

(75) Inventors: Toshifumi Ueda, Aichi (JP); Nobuyasu Morishita, Aichi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 10/175,437

(22) Filed: Jun. 18, 2002

(65) Prior Publication Data

US 2003/0001541 A1 Jan. 2, 2003

(30) Foreign Application Priority Data

Jun. 20, 2001 (JP) ........................................ 2001-187143

(51) Int. Cl.[7] .............................................. H01M 10/44
(52) U.S. Cl. ....................................... 320/132; 320/131
(58) Field of Search ................................. 320/126, 127, 320/131, 132, 149; 324/436, 433

(56) References Cited

U.S. PATENT DOCUMENTS

| 4,876,513 A | * | 10/1989 | Brilmyer et al. |
| 4,912,416 A | * | 3/1990 | Champlin |
| 5,998,968 A | * | 12/1999 | Pittman et al. |
| 6,127,806 A | * | 10/2000 | Tanjo et al. |

FOREIGN PATENT DOCUMENTS

JP        11-313447        11/1999

* cited by examiner

*Primary Examiner*—Edward H. Tso
(74) *Attorney, Agent, or Firm*—Snell & Wilmer, LLP

(57) ABSTRACT

The present invention provides a method for controlling battery charging and discharging in which a battery is charged and discharged such that a SOC (state of charge) value of the battery is increased/decreased to a predetermined range when the SOC value of the battery is in a predetermined range; and a range of the SOC values in which charging and discharging processes are performed sequentially varies and a range of the SOC values after the charging and discharging processes also sequentially varies.

4 Claims, 4 Drawing Sheets

METHOD FOR CONTROLLING BATTERY CHARGE AND DISCHARGE

BACKGROUND OF THE INVENTION

1. Field of the Invention

The present invention relates to a method for controlling charging and discharging processes with respect to a battery mounted on an electric vehicle, an electric powered carrier vehicle, or the like.

2. Description of the related art

An automated guided vehicle (AGV) is an electrically driven vehicle which uses a battery as at least a part of a power source thereof. For example, AGVs are used as electric powered carrier vehicles for automatically carrying parts at assembly plants for a variety of products. A battery mounted on an AGV is, for example, a high-voltage battery pack including a plurality of rechargeable cells serially connected together.

An AGV typically travels in a plant from a station as a starting point along a predetermined path and returns to the station so as to charge the battery mounted thereon. This operation is repeatedly performed. Electric power consumed by traveling along the predetermined path is usually as slight as substantially 10% of the battery capacity. The battery is not intended to be fully charged for safety reasons, etc., and therefore the battery is repeatedly charged and discharged such that the battery SOC (state of charge) is in a range from about 50% to about 60%, for example.

In the battery repeatedly charged and discharged so as to have a relatively narrow SOC range as described above, a charging memory effect is known to occur. The charging memory effect refers to a phenomenon such as an increase in voltage caused at the last stage of a charging process by repeatedly charging and discharging a battery in a shallow SOC range. In the case where the charging memory effect is caused in a specific SOC range, when an SOC value of the battery is increased so as to be higher than a value in the specific SOC range, a battery voltage is increased, thereby causing a reduction in charging efficiency, for example.

In a basic relationship between the SOC value of the battery and the battery voltage, the battery voltage has a tendency to increase according to an increase in the SOC value. Both in the range of a low SOC value which is in the proximity of 0% and the range of a high SOC value which is in the proximity of 100%, the battery voltage is significantly increased. The battery voltage has a slight tendency to increase between both ranges according to an increase in the SOC value.

The aforementioned AGV employs a system in which, when an excessive charging voltage is detected, a battery of the AGV is forcedly discharged for safety so as to cause the SOC value to be decreased to a lowest level in a range of the SOC values in which the charging and discharging processes are performed. For example, in the case where the range of the SOC values in which the charging and discharging processes are performed is between about 50% and about 60% and a battery voltage corresponding to about 70% of the SOC is set so as to be a highest voltage for charging the battery, the charging and discharging processes are usually performed such that the battery voltage corresponds to between about 50% of the SOC and about 60% of the SOC. When the charging voltage is increased to the predetermined highest level, the battery is forcedly discharged so as to have the SOC value of 50% which is the lowest level in the range of the SOC values in which the charging and discharging processes are performed.

However, when the charging memory effect occurs in the battery and the SOC value of the battery is increased so as to be higher than the SOC value at which the charging memory effect is caused, the battery voltage is rapidly increased, and therefore the battery voltage is erroneously detected as if the value of the battery voltage is at the highest level for charging the battery, so that the battery is forcedly discharged although the level of the battery voltage is lower than the highest level. As a result, the SOC value is decreased to the lowest level in the range of the SOC values in which the charging and discharging processes are performed. In this manner, the SOC value of the battery is forcedly decreased so as not to sufficiently charge the battery, and therefore repeating this operation might cause the battery of the AGV to be incapable of being sufficiently charged.

For example, in the case where the battery voltage corresponding to about 70% of the SOC is set so as to be the highest voltage for charging the battery, when the charging memory effect causes the battery voltage to be considered by a detector (not shown) as being increased to the highest voltage while the actual battery voltage corresponds to about 60% of the SOC, the battery is forcedly discharged so as to have the SOC value of 50%. As a result, the charging and discharging processes are performed with respect to the battery which is not sufficiently charged. In such a state, when the charging memory effect is caused again, the battery is forcedly discharged so that the charging and discharging processes are performed with respect to the battery which is not sufficiently charged. In this manner, when the battery of the AGV is forcedly discharged at a low SOC value due to the charging memory effect, the battery is not sufficiently charged, which may cause the AGV to be incapable of traveling.

The charging memory effect can be prevented by performing a refresh charging and discharging process such that the battery is forcedly discharged so as to have the SOC value of 0% and is fully charged so as to have the SOC value of 100%. However, such a process is usually required to be repeated for a period of several cycles.

FIG. 4 is a graph showing relationships between the number of cycles in the refresh charging and discharging process and the charging memory effect. In FIG. 4, a relationship between the SOC value and the battery voltage denoted by (a) refers to a case where one cycle of the refresh charging and discharging process is performed. In this case, the charging memory effect is caused when the SOC value is between about 50% and about 60%. Another relationship between the SOC value and the battery voltage denoted by (b) refers to a case where two cycles of the refresh charging and discharging processes are performed. In this case, the charging memory effect is caused when the SOC value is between about 60% and about 80%. Still another relationship between the SOC value and the battery voltage denoted by (c) refers to a case where five cycles of the refresh charging and discharging processes are performed. In this case, the charging memory effect is caused when the SOC value is between about 80% and about 100%.

Still another relationship between the SOC value and the battery voltage denoted by (d) refers to a case where six cycles of the refresh charging and discharging processes are performed. Still another relationship between the SOC value and the battery voltage denoted by (e) refers to cases where seven and eight cycles of the refresh charging and discharging processes are performed. In these cases, the charging memory effect is hardly caused. Therefore, it is necessary to perform the refresh charging and discharging processes six times or more so as to prevent the charging memory effect.

A similar problem is caused to a battery mounted on a hybrid electric vehicle (HEV). The battery for a HEV (hereinafter, referred to as "HEV battery") stores not only electric power for driving an electric motor but also electric power generated in a regenerative cycle. The HEV battery is charged by a heat engine mounted thereon. Therefore, in order to prevent the HEV battery from being rapidly charged, as in the aforementioned case of the battery of the AGV (hereinafter, referred to as "AGV battery"), the HEV battery is charged and discharged so as to have a prescribed SOC value. Accordingly, there is also a possibility that the charging efficiency of the HEV battery can be reduced when the charging memory effect is caused.

SUMMARY OF THE INVENTION

According to one aspect of the present invention, there is provided a method for controlling battery charging and discharging in which a battery is charged and discharged such that a SOC (state of charge) value of the battery is increased/decreased to a predetermined range when the SOC value of the battery is in a predetermined range; and a range of the SOC values in which charging and discharging processes are performed sequentially varies and a range of the SOC values after the charging and discharging processes also sequentially varies.

In one embodiment of the invention, both the range of the SOC values in which charging and discharging processes are performed and the range of the SOC values after the charging and discharging processes vary between 10% and 100%.

In another embodiment of the invention, both the range of the SOC values in which charging and discharging processes are performed and the range of the SOC values after the charging and discharging processes vary in stages from a low SOC value to a high SOC value.

In still another embodiment of the invention, charging and discharging processes are performed such that the SOC value is decreased in stages when the range of the SOC values after the charging and discharging processes is between 40% and 100%.

Thus, the invention described herein makes possible the advantages of providing a method for controlling battery charging and discharging which can prevent charging efficiency of a battery from being reduced due to a charging memory effect.

These and other advantages of the present invention will become apparent to those skilled in the art upon reading and understanding the following detailed description with reference to the accompanying figures.

DESCRIPTION OF THE PREFERRED EMBODIMENTS

Hereinafter, examples of the present invention are described with reference to the drawings.

Figure 1:
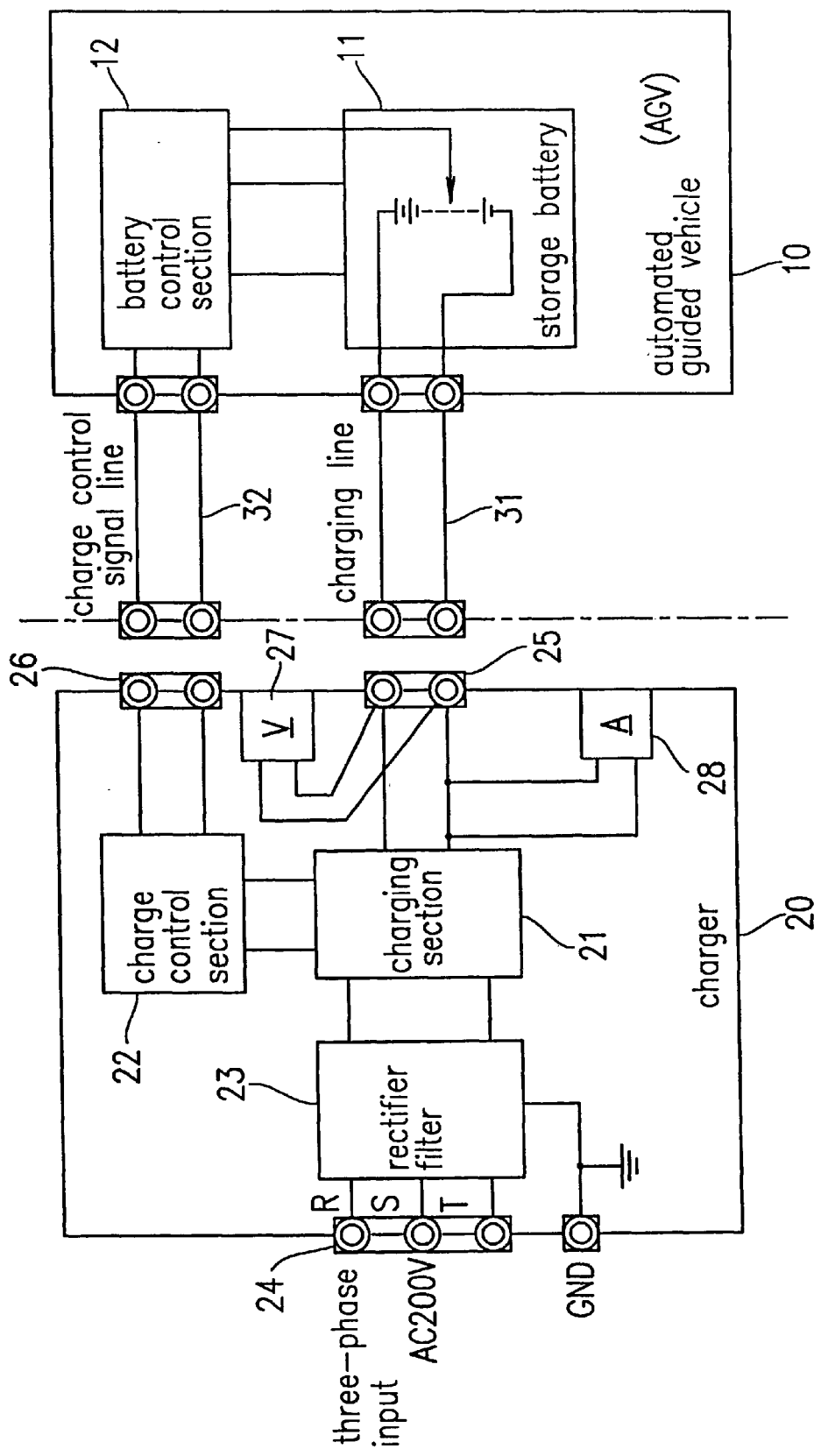
FIG. 1 is a block diagram showing an automated guided vehicle (AGV) using a method for controlling battery charging and discharging according to the present invention and a charger for the AGV.

FIG. 1 is a block diagram showing an automated guided vehicle (AGV) 10 using a method for controlling battery charging and discharging according to the present invention and a charger for the AGV 10.

The AGV 10 is intended to travel along a prescribed path in a plant, a warehouse, or the like. The AGV 10 includes a battery 11 as a power source and a battery control section 12 for controlling, for example, a discharging process with respect to the battery 11. The battery 11 is a battery pack including a plurality of cells serially connected together. The cell used in the battery 11 is a sealed nickel-metal hydride battery. The battery control section 12 stores input information with respect to the battery 11, such as SOC values, temperatures and the like.

The AGV 10 travels in a plant from a station as a starting point along a predetermined path and returns to the station so as to charge the battery 11 by means of the charger 20 provided at the station.

The battery 11 is connected to a charging line 31 which is connected to the charger 20 provided at the station when the battery 11 is being charged by the charger 20. The battery control section 12 is connected to a charge control signal line 32 through which information is input/output from/to the charger 20 when the battery 11 is being charged by the charger 20.

The charger 20 includes a charging section 21 for charging the battery 11 and a charge control section 22 for controlling the charging section 21. The charging section 21 is connected to a rectifier filter 23 and receives three-phase alternating current (AC 200 V) input from an input terminal 24 through the rectifier filter 23.

The charging section 21 includes a charge terminal 25 connected to the charging line 31 when charging the battery 11. The charge control section 22 includes a control signal terminal 26 which is connected to the charge control signal line 32 when charging the battery 11. The charge terminal 25 is connected to a voltmeter 27 for detecting a voltage applied to the battery 11 when charging the battery 11. An amperemeter 28 is connected between the charging section 21 and the charge terminal 25 for detecting current applied to the battery 11 when charging the battery 11.

The battery 11 mounted on the AGV 10 structured in the above-described manner is charged by the charger 20 provided at the station in the following manner.

The battery 11 mounted on the AGV 10 usually consumes (discharges) a substantially fixed quantity of electric power during each journey along the prescribed path. After each time the AGV 10 travels along the prescribed path, the charging line 31 and charge control signal line 32 of the AGV 10 are respectively connected to the charge terminal 25 and control signal terminal 26 of the charger 20. The charging section 21 receives three-phase alternating current which is input from the input terminal 24 and rectified by the rectifier filter 23. The charging section 21 is controlled by the charge control section 22 so as to apply the received current to the battery 11 via the charging line 31. The charge control section 22 controls the charging section 21 based on a signal output by the battery control section 12 via the charge control signal line 32.

In this case, the battery 11 is intended to receive a greater quantity of charge power than a quantity of power discharged for each journey along the prescribed path, thereby increasing the SOC value of the battery 11 by a substantially fixed quantity. For example, when the quantity of power discharged from the battery 11 for each journey of the AGV 10 corresponds to 10% of the SOC, the quantity of charge power applied to the battery 11 corresponds to 20% of the SOC. Accordingly, the SOC value of the battery 11 is increased by 10% through the charging process performed by the charger 20 for each journey of the AGV 10.

As described above, the SOC value of the battery 11 is increased each time the battery 11 is charged by the charger 20. When the SOC value of the battery 11 is increased so as to be between about 40% and about 100%, the charge control section 22 controls the charging section 21 such that the quantity of charge applied to the battery 11 is zero, and therefore the charging operation performed by the charger 20 on the battery 11 is ceased. Accordingly, the battery 11 is discharged through the journeys of the AGV 10 and the SOC value of the battery 11 is sequentially reduced until the SOC value becomes 10%.

Alternatively, the quantity of charge power applied to the battery 11 is set so as to correspond to 10% of the SOC and the quantity of power discharged from the battery 11 is set so as to correspond to 20% of the SOC. As a result of this, each time the battery 11 is charged by the charging section 21, the SOC value of the battery 11 is forcedly reduced by 10%, for example, such that the SOC value becomes 10%.

As described above, when the SOC value is reduced to 10%, the quantity of charge power applied to the battery 11 by the charger 20 corresponds to 20% of the SOC, thereby charging the battery 11.

Since a range of the SOC values in which the charging and discharging processes are performed sequentially varies and a range of the SOC values after the charging and discharging processes also sequentially varies, it is possible to prevent the charging memory effect caused by repeating the charging and discharging processes in a specific SOC range. As a result, an increase in a battery voltage due to the charging memory effect is suppressed, and therefore there are substantially no possibilities that a highest charge voltage upon the occurrence of which the battery 11 is forcedly discharged is erroneously detected.

Further, when repeating the charging and discharging processes in this manner, while the SOC value is in a range from 10% to 100%, by performing a refresh charging and discharging process once or twice, a significant refresh effect can be achieved, thereby ensuring that the charging memory effect is prevented.

Figure 2:
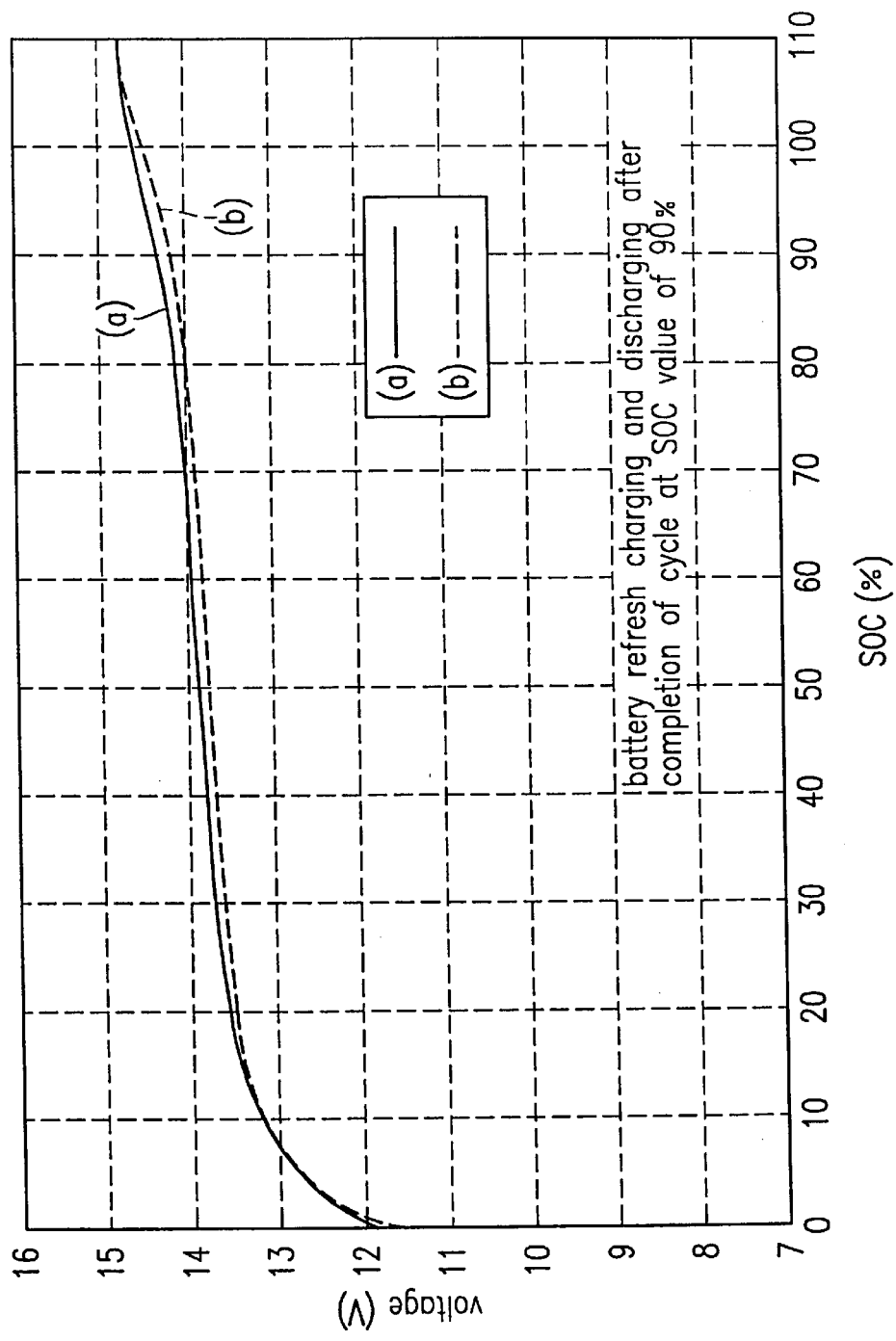
FIG. 2 is a graph showing variations in charging characteristics of a battery of the AGV shown in FIG. 1 which is charged under the control of the charger so as to perform a refresh charging and discharging process.

FIG. 2 is a graph showing relationships between the SOC value and the battery voltage with respect to the AGV 10 using the method of charging and discharging according to the present invention. In FIG. 2, a relationship between the SOC value and the battery voltage denoted by (a) refers to a case where one cycle of the refresh charging and discharging process is performed by controlling charging and discharging of the battery 11 so as to sequentially change the SOC value in a range of between about 10% and about 100%, forcedly discharging remaining power from the battery 11 when the SOC value is increased to about 90%, and fully charging the battery 11. Another relationship between the SOC value and the battery voltage denoted by (b) refers to a case where two cycles of the refresh charging and discharging processes are performed in the same manner as in the case of (a). One or two cycles of the refresh charging and discharging processes provide significant refresh effects so as to prevent the occurrence of the charging memory effect.

Figure 3:
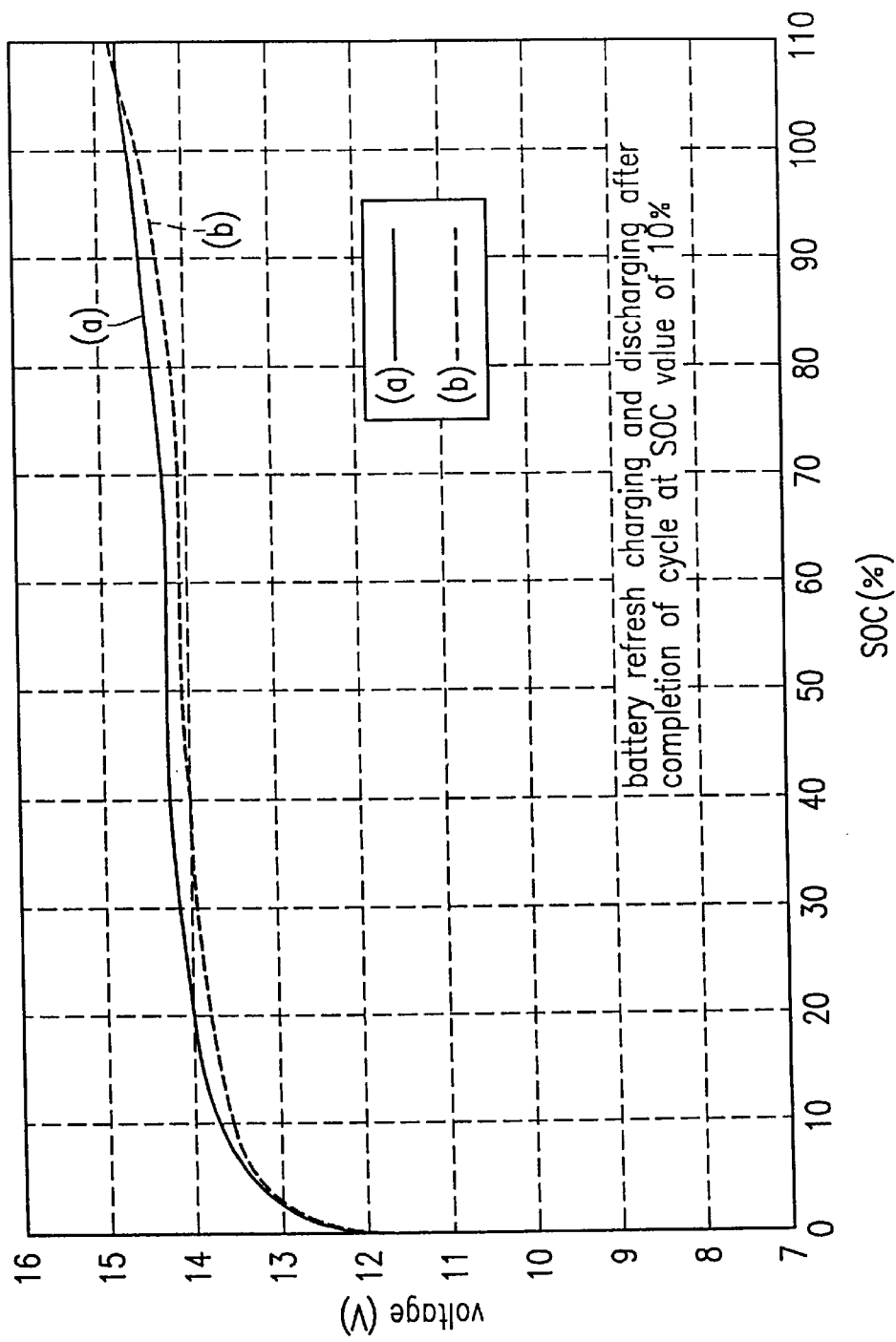
FIG. 3 is a graph showing variations in charging characteristics of a battery of the AGV shown in FIG. 1 which is charged under the control of the charger so as to perform a refresh charging and discharging process under conditions differing from those of the refresh charging discharging process of FIG. 2.
Figure 4:
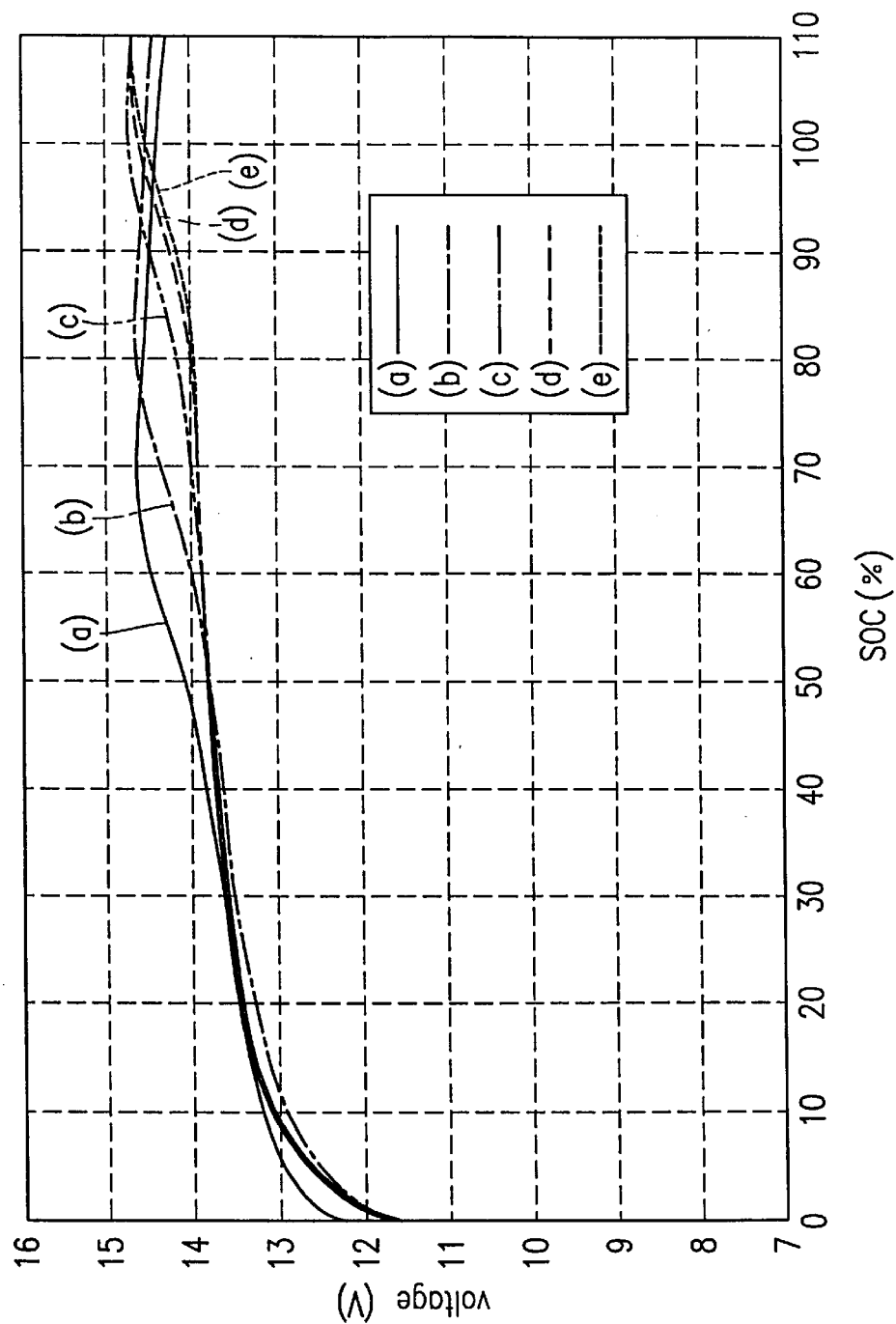
FIG. 4 is a graph showing variations in charging characteristics of a battery which is charged and discharged under the control of a conventional charger using a conventional method for controlling battery charging and discharging.

FIG. 3 is a graph showing relationships between the SOC value and the battery voltage with respect to the AGV 10 using the method of charging and discharging according to the present invention. In FIG. 3, a relationship between the SOC value and the battery voltage denoted by (a) refers to a case where one cycle of the refresh charging and discharging process is performed by controlling charging and discharging of the battery 11 so as to sequentially change the SOC value in a range of between about 10% and about 100%, forcedly discharging remaining power from the battery 11 when the SOC value is decreased to about 10%, and fully charging the battery 11. Another relationship between the SOC value and the battery voltage denoted by (b) refers to a case where two cycles of the refresh charging and discharging processes are performed in the same manner as in the case of (a). One or two cycles of the refresh charging and discharging processes provide significant refresh effects so as to prevent the occurrence of the charging memory effect.

According to the present invention, both the range of the SOC values at which the charging and discharging processes are performed and the range of the SOC values of charge power applied to the battery 11 are preferably between 10% and 100%, and more preferably between 20% and 80%.

It should be noted that the present invention is not limited to the above-described configuration in which the battery 11 is excessively charged until the SOC value of the battery 11 is increased to a predetermined highest level, and charging and discharging processes are performed so as to apply zero charge power to the battery 11 or excessively discharge greater power from the battery 11 than charge power applied thereto until the SOC value is decreased to the predetermined lowest level. For example, the present invention can be configured such the battery 11 is excessively charged until a prescribed parameter, such as a highest voltage, a highest temperature, an increase in temperature per unit time (dT/dt), or current-voltage (I-V) of the battery 11, reaches its highest level, and then is excessively discharged such that power discharged from the battery 11 is greater than charge power applied thereto until the prescribed parameter reaches its lowest level. In any case, necessary information with respect to the battery 11 is suitably provided to the charge control section 22 via the battery control section 12.

Although the example of the present invention has been described above with respect to charging and discharging control of the battery 11 mounted on the AGV 10, the present invention is not limited to such a case and is applicable to a HEV battery which is charged and discharged in a prescribed SOC range in which the SOC value is less than 100%.

As described above, in the method for controlling battery charging and discharging according to the present invention, both the range of the SOC values at which the charging and discharging processes are performed and the range of the SOC values after the charging and discharging processes are sequentially changed, and therefore there is substantially no possibility that the charging memory effect is caused in the battery. Accordingly, it is possible to prevent erroneous detection of the highest charging voltage due to a charge voltage increased when the charging memory effect occurs. Further, it is possible to reduce the number of cycles of a refresh charging and discharging process required for preventing the charging memory effect.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for controlling battery charging and discharging, wherein:
    a battery is charged and discharged such that a SOC (state of charge) value of the battery is increased/decreased to a predetermined range when the SOC value of the battery is in a predetermined range; and
    a range of the SOC values in which charging and discharging processes are performed sequentially varies and a range of the SOC values after the charging and discharging processes also sequentially varies.

2. A method for controlling battery charging and discharging according to claim 1, wherein both the range of the SOC values in which charging and discharging processes are performed and the range of the SOC values after the charging and discharging processes vary between 10% and 100%.

3. A method for controlling battery charging and discharging according to claim 1, wherein both the range of the SOC values in which charging and discharging processes are performed and the range of the SOC values after the charging and discharging processes vary in stages from a low SOC value to a high SOC value.

4. A method for controlling battery charging and discharging according to claim 1, wherein charging and discharging processes are performed such that the SOC value is decreased in stages when the range of the SOC values after the charging and discharging processes is between 40% and 100%.

* * * * *